2,239,765

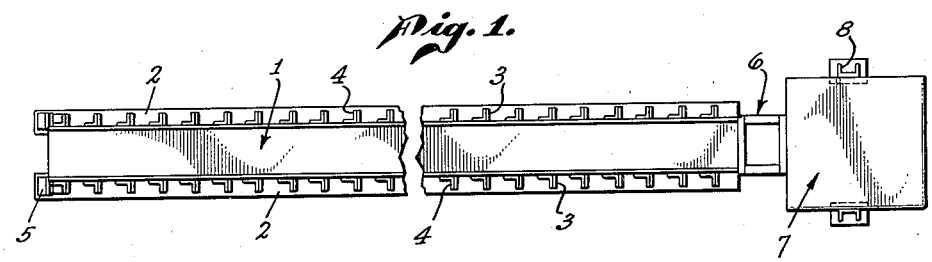
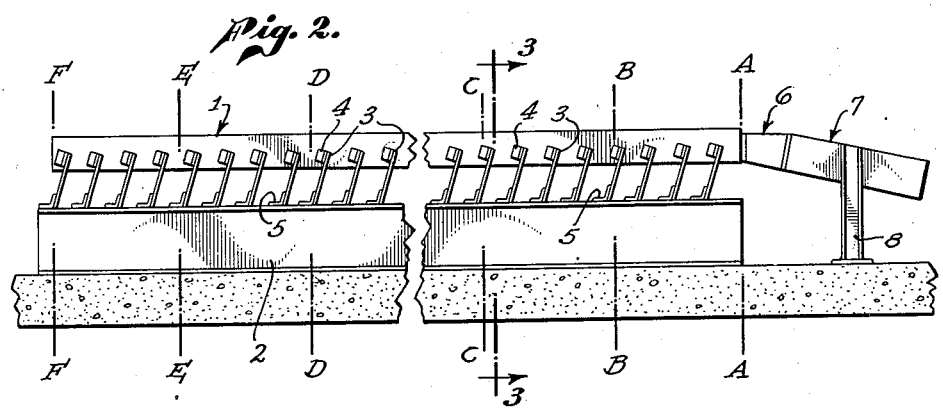
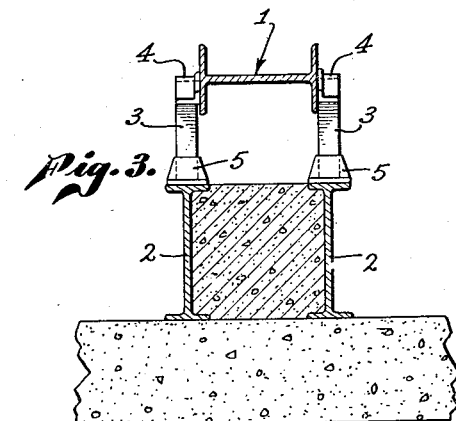
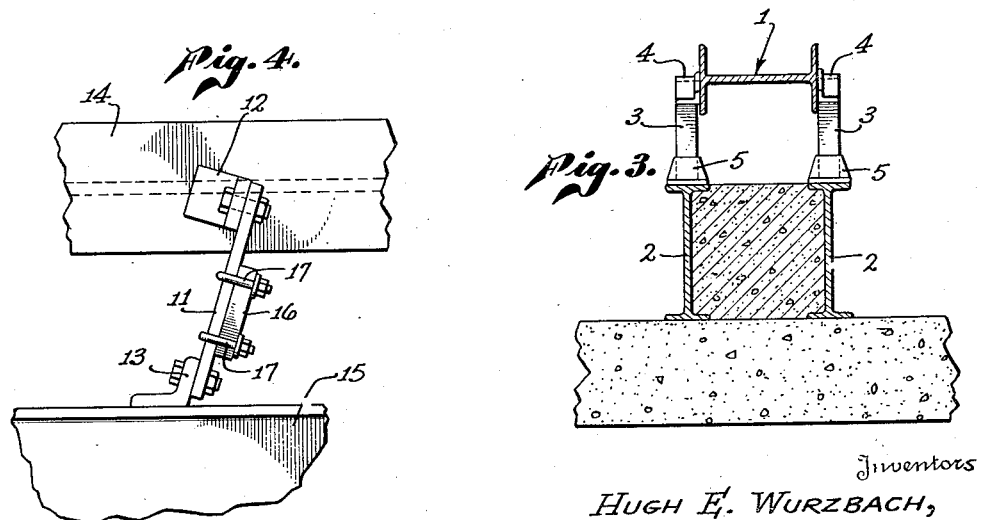
Inventors
HUGH E. WURZBACH,
CLYDE H. KONOLD, Inventors
HUGH E. WURZBACH,
CLYDE H. KONOLD, Patented Apr. 29, 1941

UNITED STATES PATENT OFFICE 2,239,765

ELONGATED VIBRATORY CONVEYER

Hugh E. Wurzbach and Clyde H. Konold, Magna, Utah

Application March 15, 1940, Serial No. 324,136

18 Claims. (Cl. 198—220)

This invention relates to elongated vibratory conveying structures adapted for vibration at a relatively high frequency in a direction generally along the length thereof, and pertains more particularly to constructions which are adapted to eliminate the ununiformities in conveying action usually exhibited by elongated conveyers and to arrangements which allow the fabrication of longer conveyers operated by a single vibratory motor means than have been heretofore considered possible.

This application is a continuation-in-part of our copending application Serial No. 271,301, filed May 2, 1939.

Vibratory conveyers operating at small amplitudes and relatively high frequency present two general types of inhomogeneities in conveying action. In relatively short conveyers, i. e., of lengths from a few inches to several feet, and comparatively narrow widths, i. e., widths of from a few inches to a foot or so, no particular difficulty is encountered if the conveying pan or trough is of a comparatively rigid nature so as to vibrate substantially as a unit. When the length of the conveyer is in the neighborhood of thirty feet or more, however, or where the width of the conveyer becomes excessive, the conveyer pan or trough ceases to vibrate as a unit and disconformities in the conveying action become real difficulties, which seriously affect the conveying efficiency of the structure.

In part, these difficulties may be due to the natural longitudinal resilience or elasticity of the trough member, which, apart from inhomogeneities therein due to fabrication, would cause the production of "standing waves" during vibration, resulting in ununiform vibratory conveying action along its length. These difficulties may further be complicated by one or more of the conditions inherent in the construction, such as structural inhomogeneities in the conveyer trough due to changes in cross-section, density, resiliency, or the like, or the presence of bolts, rivets, welded sections, etc., all of which factors affect the longitudinal elasticity of the conveyer body and thus affect the vibrational characteristics thereof when subjected to positive driving forces at any one position.

The two general types of inhomogeneities in conveying action are $a$ those resulting primarily from the longitudinal resiliency of the conveyer pan or trough, and $b$ those resulting primarily from local variations in the structure, which cause an asymmetric conveying action with respect to the width of the conveyer. The present invention is concerned with the solution of the problem arising from the $a$ type of inhomogeneities, while the type $b$ inhomogeneities are dealt with in the above-mentioned copending application, and in any mention hereinafter of inhomogeneities in the conveying action, it will be understood that reference to type $a$ is intended. Inhomogeneities of type $a$ increase in importance as the length of the conveyer is increased, so that it becomes impossible to satisfactorily operate with a single driving element an elongated conveyer having a length in excess of about thirty feet when following the teachings of conventional constructions.

Heretofore, while these inhomogeneities have undoubtedly been observed, the solution of the problem of securing adequate conveying movement has been merely that of applying sufficient driving force, at short enough intervals along the length of the conveyer, to create a positive conveying movement of the conveyer trough at all positions along its length. This means that the adverse vibratory movements were merely overcome by the superimposition of driving forces of sufficiently great magnitude. According to the present invention, the vibratory conveyer body is so mounted that the resultant vibratory movement thereof is uniform along its length, wherefore no inhomogeneities are present to be overcome.

It is, therefore, a particular and important object of this invention to provide a construction by means of which a unitary elongated conveyer having a length in excess of about thirty feet may be operated by means of a single vibratory motor means to secure a substantially uniform conveying action along its length.

The apparatus of the present invention comprises, essentially, an elongated conveyer trough or table member provided with a plurality of upstanding cantilever supports which are spaced longitudinally at intervals along the length of the trough and are preferably spaced at intervals of one foot or less. It is also preferable to provide two series of cantilever supports and to arrange one series along each side of the trough, although a single series of cantilevers disposed in supporting relation to the trough may be used. The cantilever supports are supported on a suitable base structure such as a concrete foundation; and vibratory motor means for imparting high-frequency (i. e., a frequency between 2000 and 10,000 cycles per minute) vibratory movement to the trough, such movement having a substantial component along the length of said conveyer trough, is attached thereto in any convenient location. According to the present invention, any portion of the length of the conveyer body which is in excess of 30 feet in length, as measured from the point of application of the vibratory driving forces, i. e., from the point of attachment of the driving motor, is provided with upstanding cantilever supports of greater stiffness at the end thereof removed from such point than at the end thereof adjacent such point. In particular, the vibratory supports at any position along the length of such portion which is further than 30 feet removed from such point of application of driving forces will be stiffer than the supports adjacent such point.

Other objects and features of the invention will be brought out in the ensuing description of a typical embodiment of the invention, or will be apparent therefrom. The accompanying drawings illustrate such typical embodiment, together with certain schematically delineated modifications, and referring thereto:

Fig. 1 is a plan view of the device, with the center section broken away;

Fig. 2 is a corresponding side elevation thereof;

Fig. 3 is a transverse section taken on line 3—3 in Fig. 2;

Figure 5:
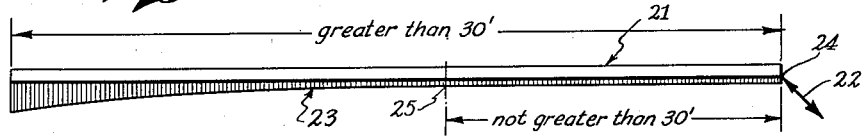

Fig. 4 is a fragmentary view of a single supporting reed, showing one arrangement which may be used for changing the stiffness of such a reed for the purposes of this invention; and Figs. 5 through 10 illustrate, in schematic fashion, six alternative arrangements of elongated conveying members provided with vibratory supporting elements varying in stiffness with respect to the length of the conveying member and the point or points of application of driving effort.

Referring to Figs. 1–4 of the drawings, an elongated trough-like conveying member is indicated at 1, supported on a base 2 through the agency of vibratory reeds or cantilever supports 3 secured to the trough 1 and the base 2 by means of brackets 4 and 5 at the respective upper and lower ends of the supports. The trough 1 is operatively connected as at 6 to a vibratory motor 7 independently supported with respect to the trough 1 by means of a support member 8 and, in this embodiment, disposed adjacent one end of the trough. The reeds or cantilever supports 3 are preferably disposed directly opposite one another at the respective longitudinal sides of the conveyer trough 1, and are preferably also spaced longitudinally at intervals of not more than one foot, in order to most fully realize the advantages of the invention.

While in the illustration of the one specific form of the invention in Figs. 1, 2 and 3 we have shown the supporting reeds as arranged in two cooperating series, one series disposed along each side of the conveyer trough, it will be appreciated that one might employ, with full equivalency, a single series of supporting reeds arranged centrally of the width of the conveyer trough. Similarly, the supporting reeds may be arranged in depending relation, with their upper ends secured to a fixed upper base structure and their lower ends secured to the conveyer trough, without departure from the spirit and scope of our invention.

The motor 7 may be of any desired type, such as of the electromagnetic type illustrated in our issued U. S. Patents Nos. 2,102,826 and 2,071,373, if desired, although any equivalent motor means may alternatively be employed. The motor means will be of a type adapted to produce relatively high-frequency vibratory movement, such as on the order of 2,000 to 10,000 cycles per minute, as is conveniently obtained in the electromagnetic type by the use of alternating current, commercial frequencies of 50 or 60 cycle current providing 3,000, 3,600, 6,000, and 7,200 cycles per minute, depending upon the current frequency and type of energization employed on the electromagnet.

We may assume that the trough 1 has a width which is considerably less than its length and that its length is in excess of about 30 feet, since the problems which are solved by our invention do not come into existence ordinarily with conveyer troughs when they are shorter than this and are fabricated from common materials such as mild steel. As pointed out above, it has heretofore been impossible to operate such a conveyer having a length greater than about 25 or 30 feet with a single driving motor, yet we have been able to operate conveyers constructed according to our invention, with a single vibratory motor, which are much longer than this. For example, we have satisfactorily operated a conveyer which is around 75 feet in length and about one foot in width with a single vibratory motor which is placed at one end of the conveyer.

To accomplish this, we have departed from the conventional practice of making all of the supporting reeds of substantially the same stiffness by providing reeds of different stiffness at different longitudinal positions along the trough. More particularly, we have found that such elongated conveyers may be caused to operate satisfactorily by providing stiffer reeds at positions removed from the driving motor than the reeds which are adjacent the driving motor. It is appreciated that the frequency of vibration of an assembly comprising a cantilever support having a weighted free end is dependent upon the weight or mass vibrated and the restoring force which is stored up in the resilient support due to a given deflection. Thus the expression "stiffness" is so related to the restoring force exhibited by a given cantilever that a change in stiffness could be considered as a change in cross-section, material, length or rigidity of mounting of such cantilever. For example, a reed of given cross-section and material may be rendered less stiff and thus have its normal vibratory frequency lowered by loosening one of the brackets 4 or 5. As another example, a reed of given cross-section and material may be stiffened as by bolting a stiffening block to the flexible portion thereof to give the effect of shortening the support. This latter expedient is illustrated in Fig. 4, wherein a reed support is shown at 11, secured in brackets 12 and 13 fastened to a conveyer 14 and a base 15 and corresponding to the brackets 4 and 5 above, a stiffening block 16 being bolted to the reed 11 as at 17. In case the above-described expedients for decreasing or increasing the stiffness of the support are not resorted to, it should be apparent that supports of different cross-section or material may be substituted therefor.

The stiffness of successive reeds, proceeding in a direction away from the driven end, may be progressively increased, or groups of reeds of different stiffness may be provided at spaced positions along the length of the trough 1, all of the reeds in a particular group being of substantially the same stiffness. For example, the group within the zone A—B indicated in Fig. 2 may be of one stiffness, the group B—C of a greater stiffness, the groups C—D, D—E of still greater stiffness, and the group E—F of the greatest stiffness. It will be appreciated that the break in the length of the structure, indicated as in the group C—D, may represent the omission of one or more of the groups of reed supports, and that the length of the conveyer may be broken down into a greater or lesser number of groups than that shown, without departing from the spirit and scope of this disclosure.

The above-described arrangement of reeds (i. e., the stiffness relation of the reeds with respect to the length of the conveyer) is intended to be employed wherever a section of the conveyer longer than 30 feet is to be driven by a vibratory motor, independent of which end of the conveyer is caused to be the "receiving" or "discharge" end. In Figs. 5 through 10 we have illustrated various types of conveyer installations. In Fig. 5 a conveyer 21 is shown, provided with a single driving motor 22 at one end thereof. The "conveyer portion" driven by this motor is in this case the entire length of conveyer, and we have illustrated the relative stiffness of the supports by the shaded area below the conveyer body, as at 23. In this case one may use supports of one stiffness from the point of attachment 24 of the motor 22 down to a point 25 which is not in excess of 30 feet removed from point 24, and supports of increasing stiffness from point 25 to the other end of the conveyer.

Figure 6:
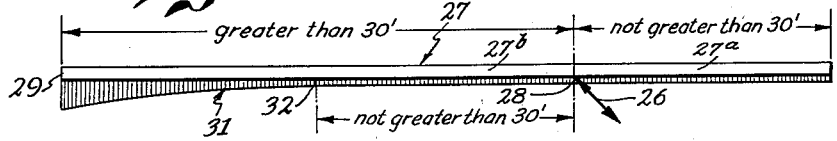

In Fig. 6, a motor 26 is connected to a conveyer 27 at a point not more than 30 feet removed from one end, as at 28, and the supporting reeds are made stiffer towards the other end 29, the relative stiffness of the reeds at the various longitudinal positions along the conveyer being indicated by the shaded area 31. It will be noted that along portion 27a of the conveyer, the portion between the driving motor 26 and the nearest end, the reeds are shown to be of uniform stiffness since this portion is not greater than 30 feet in length. Also, reeds of uniform stiffness may be used along portion 27b which extends between points 28 and 32, since this portion is not greater than 30 feet in length.

Figure 7:
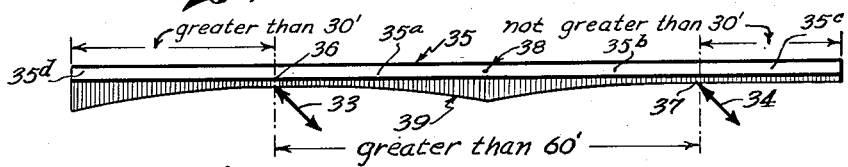

In Fig. 7, motors 33 and 34 are shown attached to a conveyer 35 at points 36 and 37 respectively which are separated from one another by a distance greater than 60 feet. Assuming that the motors 33 and 34 are of the same power, which is normally the case when a plurality of motors are used, it may be stated that each motor constitutes the sole means for imparting vibratory conveying motion to one-half of the conveyer portion between them. Thus the motor 33 constitutes the sole means for imparting vibratory conveying motion to conveyer portion 35a which lies between points 36 and 38, the point 38 lying midway between points 36 and 37, and the motor 34 constitutes the sole means for imparting vibratory conveying motion to conveyer portion 35b, which lies between points 37 and 38. Since the distance between the points 36 and 37 is greater than 60 feet, the conveyer portions 35a and 35b are each greater than 30 feet in length. For that reason the stiffness of the reeds along each of these portions is graduated, the stiffness of the reeds being indicated by the length of the shade lines in shaded area 39 beneath the conveyer. The stiffest reeds for each of these portions are located adjacent the point 38. It is to be noted that the vibratory motor 33 is at one end (point 36) of the portion 35a and that both the vibratory motors 33 and 34 are spaced more than 30 feet from the other end (point 38) of that portion. The same definition applies to the portion 35b.

The conveyer 35 further comprises a portion 35c, adjoining the portion 35b, for which the motor means 34 constitutes the sole means for imparting vibratory conveying motion thereto, and another portion 35d, adjoining the portion 35a, for which the motor means 33 constitutes the sole means for imparting vibratory conveying motion thereto. The portion 35c is not greater than 30 feet in length. Hence, the reeds may be of uniform stiffness throughout this portion. The portion 35d is greater than 30 feet in length. Hence, the reeds are graduated in stiffness, with the stiffest reeds located at positions removed from the motor 33.

Figure 8:
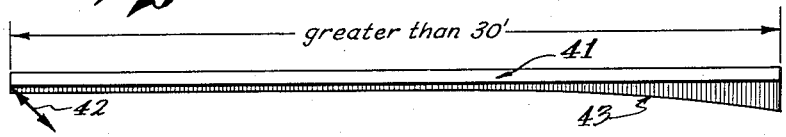

Referring now to Fig. 8, a conveyer 41 having a length greater than 30 feet is shown provided with vibratory motor means 42 attached to one of its ends (in this case, the discharge end). The stiffness of the reeds at different positions along the length of the conveyer is indicated by the shaded area 43. The reeds are graduated in stiffness at positions more than 30 feet from the driving motor, and the stiffest reeds are at the end removed from the driving motor. The same considerations apply to this figure as apply to Fig. 5, and this figure has been included to illustrate that the arrangement of reeds does not depend upon the direction of application of the driving force but upon the position of the application of the driving force.

Figure 9:
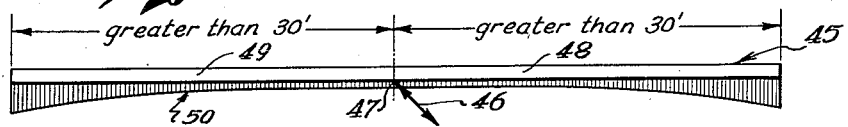

In Fig. 9 a unitary conveyer body 45 is shown provided with a vibratory motor 46 which is attached thereto at a point 47 located intermediate its ends. The conveyer thus comprises two portions 48 and 49, and the motor means 46 comprises the sole means for imparting vibratory conveying motion to each of these portions. Since each of these portions is greater than 30 feet in length, the reeds under these portions are stiffer at positions removed from the vibratory motor than they are at positions adjacent the vibratory motor. The stiffness of the reeds at the different positions along the conveyer is indicated by the depth of the shaded portion 50 beneath the conveyer.

Figure 10:
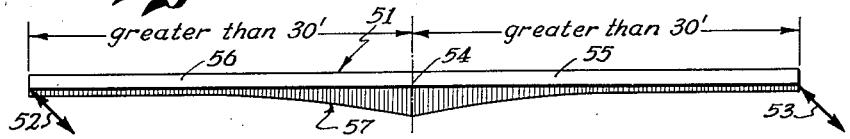

Referring to Fig. 10, a unitary conveyer 51 is shown provided with vibratory motor means 52 and 53 disposed at the ends thereof and each comprising the sole means for imparting vibratory conveying motion to that portion of the conveyer between its point of attachment and a point 54. Thus the vibratory motor 53 imparts vibratory motion to a conveyer portion 55, and the vibratory motor 52 imparts conveying motion to a portion 56. Each of these portions is greater than 30 feet in length. For that reason the supports for each of these sections which are located adjacent the point 54 are stiffer than the supports which are located adjacent the respective vibratory motors. The relative stiffness of the supports at different positions along the length of the conveyer are illustrated by the depth of the shading in the shaded area 57 located beneath the conveyer.

In Figs. 5 through 10 examples have been shown in which the reeds, which support a conveyer portion which is driven by a single vibratory motor means and is greater than 30 feet in length, are of uniform stiffness in that part of this portion which is not more than 30 feet from the position of attachment of the vibratory motor means. Although it is not necessary to graduate the stiffness of such reeds, it is sometimes desirable so to do, so that the stiffness of the reeds increases progressively from the position of attachment of the vibratory motor means to the end of that portion greater than 30 feet in length which is driven by that motor means. It should also be appreciated that instead of increasing the stiffness progressively from reed to reed in a direction away from the position of the vibratory motor means, the stiffness may be increased by groups as described in connection with Fig. 2.

In the above examples wherein the conveyer is driven by a plurality of motors it is assumed for convenience that the motors are of the same strength and each comprises the sole means for imparting vibratory conveying motion to one-half the conveyer distance by which they are separated. It should be obvious that the motors may be of different strengths, in which case the stronger motor will comprise the sole means for imparting vibratory conveying motion to a greater portion of the conveyer distance separating such motors. In any event, when the conveyer portion operated by any one motor is greater than 30 feet in length the reeds under such portion will be graduated in stiffness as above described.

It will be appreciated that modifications of this invention will occur to those skilled in the art, and for this reason we do not choose to be limited to the forms of the invention herein delineated and described, but rather to the scope of the subjoined claims.

We claim:

1. An elongated vibratory conveyer which comprises: a base; a unitary conveyer body having at least one portion whose length is greater than thirty feet; a plurality of spaced cantilever supports mounted on said base and connected to said body in supporting relation thereto at longitudinal intervals throughout the length of said body for supporting said body relative to said base; and vibratory motor means operatively associated with said body and adapted to impart a vibratory conveying motion thereto at a predetermined frequency in a direction having a substantial component along the length of said body, said vibratory motor means constituting the sole means for imparting vibratory conveying motion to said one portion and being attached to said body at one or more positions, one of which is at one end of said one portion and each of which is spaced more than 30 feet from the other end of said one portion, the cantilever supports connected to said one portion adjacent said other end thereof being stiffer than the supports connected to said one portion adjacent said one end thereof.

2. A conveyer as set forth in claim 1, said cantilever supports being disposed at longitudinal intervals of not in excess of one foot throughout said portion of said body.

3. An elongated vibratory conveyer which comprises: a base; a unitary conveyer body having at least one portion whose length is greater than thirty feet; a plurality of spaced cantilever supports mounted on said base and connected to said body in supporting relation thereto at longitudinal intervals throughout the length of said body for supporting said body relative to said base; and vibratory motor means operatively associated with said body and adapted to impart a vibratory conveying motion thereto at a predetermined frequency in a direction having a substantial component along the length of said body, said vibratory motor means constituting the sole means for imparting vibratory conveyingn motion to said one portion after being attached to said body at one or more positions, one of which is at one end of said one portion and each of which is spaced more than 30 feet from the other end of said one portion, the cantilever supports connected to said one portion being stiffer at positions adjacent said other end than at positions adjacent said one end, the supports connected to said portion at different longitudinal positions progressively increasing in stiffness from a position not greater than 30 feet from said one end to a position adjacent said other end.

4. A conveyer as set forth in claim 3, in which said progressive increase in stiffness is a uniform increase.

5. A conveyer as set forth in claim 3, said supports progressively increasing in stiffness from a position adjacent the attachment of said motor means to said other end of said portion.

6. A conveyer as set forth in claim 3, said supports of progressively increasing stiffness comprising a plurality of groups of supports, the supports in each group being of substantially the same stiffness.

7. A conveyer as set forth in claim 3, said cantilever supports being disposed at longitudinal intervals of not in excess of one foot throughout said portion of said body.

8. An elongated vibratory conveyer which comprises: a base; a unitary conveyer body having a length greater than 30 feet; a plurality of spaced cantilever supports mounted on said base and connected to said body in supporting relation thereto at longitudinal intervals throughout the length of said body for supporting said body relative to said base; and vibratory motor means operatively associated with said body and adapted to impart a vibratory conveying motion thereto at a predetermined frequency in a direction having a substantial component along the length of said body, said vibratory motor means constituting the sole means for imparting vibratory conveying motion to said body and being attached to said body at one position only, said position being more than 30 feet from one end of said body, the cantilever supports connected to said body adjacent said one end being stiffer than the supports connected to said body adjacent the position of attachment of said motor means.

9. A conveyer as set forth in claim 8, said position of attachment being adjacent the other end of said body.

10. A conveyer as set forth in claim 8, the supports connected to said body between said one end and said position of attachment progressively increasing in stiffness at different longitudinal positions from a position spaced from but not greater than 30 feet from said position of attachment to a position adjacent said one end.

11. A conveyer as set forth in claim 8, the supports connected to said body between said one end and said position of attachment progressively increasing in stiffness at different longitudinal positions from said position of attachment to a position adjacent said one end.

12. A conveyer as set forth in claim 8, the supports connected to said body between said one end and said position of attachment comprising a plurality of groups of supports of different stiffness, the supports in each group being of substantially the same stiffness, said groups being placed at different longitudinal positions along said conveyer to provide supports of progressively increasing stiffness from a position not greater than 30 feet from the position of attachment of said motor to a position adjacent said one end.

13. A conveyer as set forth in claim 8, said cantilever supports being disposed at longitudinal intervals of not in excess of one foot throughout the portion of said conveyer body between said position of attachment and said one end.

14. An elongated vibratory conveyer which comprises: a base; a unitary conveyer body having a length greater than 30 feet; a plurality of cantilever supports mounted on said base and connected to said body in supporting relation thereto at longitudinal intervals throughout the length of said body for supporting said body relative to said base; and vibratory motor means operatively associated with said body and adapted to impart a vibratory conveying motion thereto having a substantial component along the length of said body, said vibratory motor means being attached to said body at a plurality of positions, two adjacent ones of said positions being separated by a conveyer distance in excess of 30 feet and constituting the sole means for imparting vibratory conveying motion to said distance, said distance comprising two contiguous conveyer portions each greater than 30 feet in length and each driven solely by one of said two adjacent motor means and each extending from the position of attachment of its motor means to a common position intermediate said two adjacent motor means, the cantilever supports connected to each of said portions being stiffer at positions adjacent said common position than at positions adjacent the positions of attachment of each of said two motor means.

15. A conveyer as set forth in claim 14, the supports connected to each of said portions progressively increasing in stiffness from a position not greater than 30 feet from the position of attachment of the motor means driving that portion to said common position.

16. A conveyer as set forth in claim 14, the supports connected to each of said portions progressively increasing in stiffness from the position of attachment of the motor means driving that portion to said common position.

17. A conveyer as set forth in claim 14, said cantilever supports being disposed at longitudinal intervals of not in excess of one foot throughout the conveyer distance between said two adjacent motor means.

18. A conveyer as set forth in claim 14, the supports connected to said body throughout said conveyer distance comprising a plurality of groups of supports of different stiffness, the supports in each group being of substantially the same stiffness, said groups being placed at different longitudinal positions along said distance to provide supports of progressively increasing stiffness along each of said portions from a position not more than 30 feet from the position of attachment of the motor means driving that portion to said common position.

HUGH E. WURZBACH.
CLYDE H. KONOLD.